(12) United States Patent
Fujii et al.

(10) Patent No.: US 8,204,541 B2
(45) Date of Patent: Jun. 19, 2012

(54) HOLDING BASE AND INFORMATION PROCESSING SYSTEM

(75) Inventors: Michihiro Fujii, Kato (JP); Shinichi Ohgame, Kato (JP); Kazunori Katou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 12/724,009

(22) Filed: Mar. 15, 2010

(65) Prior Publication Data

US 2010/0173674 A1 Jul. 8, 2010

Related U.S. Application Data

(63) Continuation of application No. PCT/JP2007/001411, filed on Dec. 14, 2007.

(51) Int. Cl.
*H04W 88/02* (2009.01)
(52) U.S. Cl. ............ 455/557; 324/207.2; 379/438; 361/679.01
(58) Field of Classification Search ........... 455/575.1, 455/557, 573; 324/207.2, 207.25, 207.21; 379/438; 361/679.01
See application file for complete search history.

(56) References Cited

U.S. PATENT DOCUMENTS

| 2001/0017917 A1* | 8/2001 | Roussy et al. | 379/438 |
| 2008/0211488 A1* | 9/2008 | Kang | 324/207.2 |

FOREIGN PATENT DOCUMENTS

| JP | 8-130773 A | 5/1996 |
| JP | 10-51525 A | 2/1998 |
| JP | 2000-165513 A | 6/2000 |
| JP | 2006-303859 A | 11/2006 |

OTHER PUBLICATIONS

Notification of Transmittal Translation of the International Preliminary Report on Patentability (Form PCT/IB/338) of International Application No. PCT/JP2007/001411 mailed Sep. 10, 2010 with Forms PCT/IB/373 and PCT/ISA/237.
Manual for Application P327 (http://www.nttdocomo.co.jp/english/support/trouble/manual/download/search_result.html?series=900i& maker=f&series%2Bmaker=900i_f).
Manual for Basic P30, pp. 59 (http://www.nttdocomo.co.jp/english/support/trouble/manual/download/search_result.html?series=900i& maker-f&series%2Bmaker=900i_f).
International Search Report of PCT/JP2007/001411, date of mailing Mar. 18, 2008.

* cited by examiner

*Primary Examiner* — Phuoc Doan
(74) *Attorney, Agent, or Firm* — Westerman, Hattori, Daniels & Adrian, LLP

(57) ABSTRACT

A holding base for removably holding an electronic device has a holding base body, a signal terminal provided in the holding base body, and connected to the electronic device in a holding position in which the electronic device is held, and a first connector attached to a surface of a printed circuit board, connected to the signal terminal, and connected to another electronic device. The printed circuit board is held by a bottom of the holding base body with the first connector held underneath the printed circuit board, such that a connecting port of the first connector faces a back side of the holding base body, and with an end edge of a front side of the holding base body positioned lower than an end edge of the back side thereof by an offset amount. The offset amount is set to be less than a thickness of the first connector.

8 Claims, 18 Drawing Sheets

US 8,204,541 B2

HOLDING BASE AND INFORMATION PROCESSING SYSTEM

CROSS-REFERENCE TO RELATED APPLICATIONS

This application is a continuing application, filed under 35 U.S.C. §111(a), of International Application PCT/JP2007/001411, filed on Dec. 14, 2007, the entire contents of which are incorporated herein by reference.

FIELD

The embodiment discussed herein is related to a holding base for removably holding an electronic device such as a mobile phone, and to an information processing system constituted by a mobile phone and the holding base.

BACKGROUND

In recent years, thinner and more functional electronic devices such as mobile phones have been sought. This has lead to innovations being made, even with regard to holding bases for holding mobile phones, to enable the functions of mobile phones to be utilized or extended. Such holding bases are also referred to as tabletop holders or cradles.

Heretofore, it has been possible to charge the battery of a mobile phone held in a holding base by providing the holding base with a charging connector, and connecting a connecter from a charging power unit to this connector.

Also, Japanese Laid-open Patent Publication No. 2006-303859 discloses a holding base provided with a communication USB terminal for connecting an external peripheral device, a power supply terminal for supplying power from an external source, a charging controller that charges a mobile phone using supplied power, and a USB controller having a host function. As a result of this conventional holding base, an external peripheral device and a mobile phone are capable of being USB connected without using a PC, and data communication is possible between the external peripheral device and the mobile phone.

Also, a USB (Universal Serial Bus) has had a standard called USB-OTG (On-The-Go) for connecting peripheral devices, and there are also mobile phones that incorporate a chip having a USB-OTG function.

Incidentally, there is an issue as to how a communication connector and so on are attached to a holding base. An electronic component such as a connector is generally attached to a holding base in such a manner that the main surface of the electronic component is parallel or perpendicular to the bottom surface of the holding base. In some cases, a connector is attached to a printed circuit board. This raises an issue as to how the printed circuit board to which the connector is attached is fixed to a holding base. Also in such a case, the printed circuit board is generally fixed to the holding base in such a manner that the surface of the printed circuit board is parallel or perpendicular to the bottom surface of the holding base.

As the size of a mobile phone is reduced, the size of a holding base therefor should also be reduced. Accordingly, innovations are necessary to fix a connector or a printed circuit board to a holding base.

SUMMARY

According to an aspect of the invention, a holding base for removably holding an electronic device includes a holding base body, a signal terminal that is provided in the holding base body, and connected to the electronic device in a holding position in which the electronic device is held, and a first connector that is attached to a surface of a printed circuit board, connected to the signal terminal, and connected to another electronic device. The printed circuit board is held by a bottom of the holding base body with the first connector held underneath the printed circuit board, such that a connecting port of the first connector faces a back side of the holding base body, and with an end edge of a front side of the holding base body positioned lower than an end edge of the back side of the holding base body by an offset amount, and the offset amount is set to be less than a thickness of the first connector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings.

Figure 1:
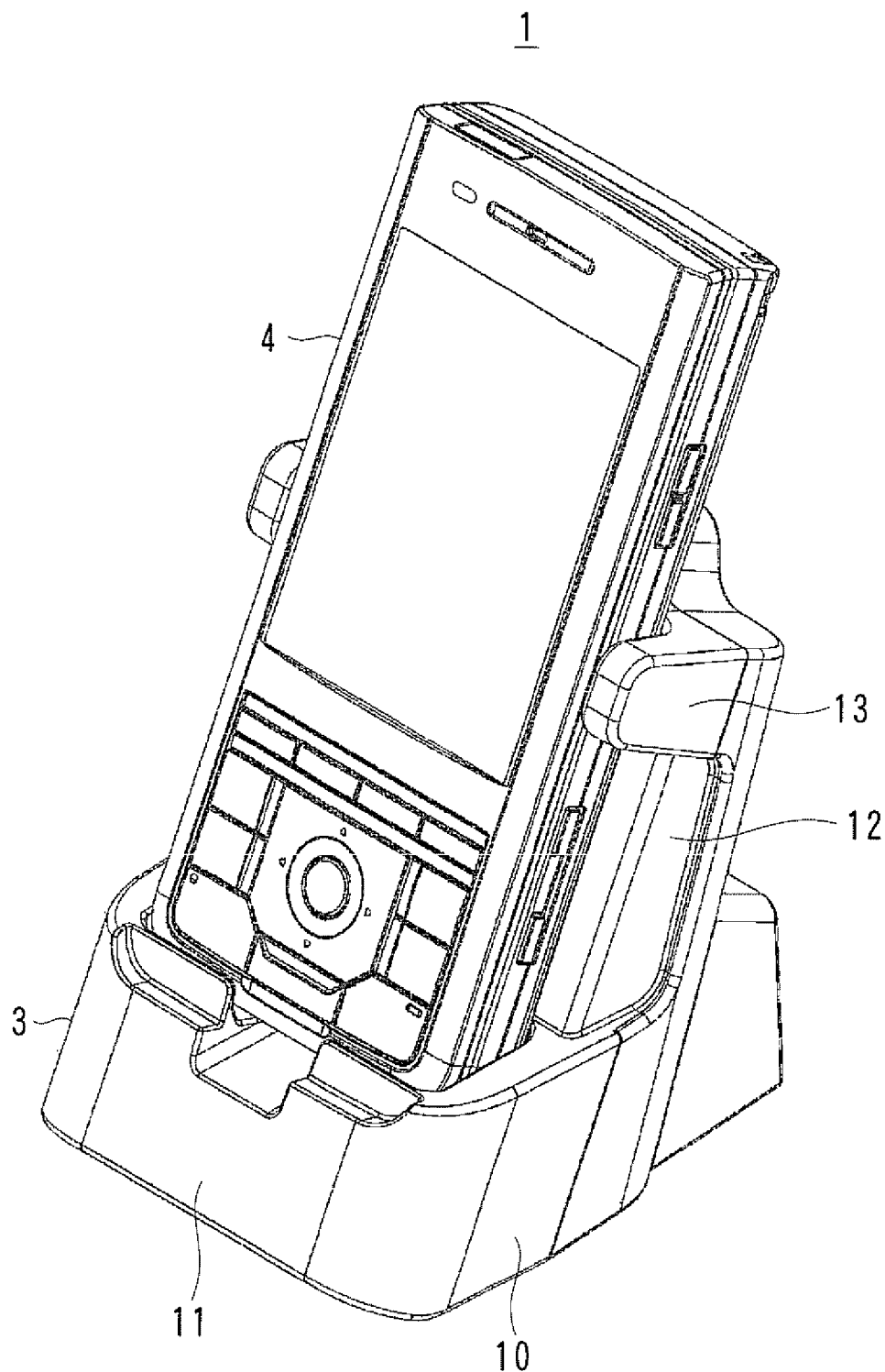
FIG. 1 is a perspective view of an information processing system according to an embodiment as seen from the front at an angle.
Figure 2:
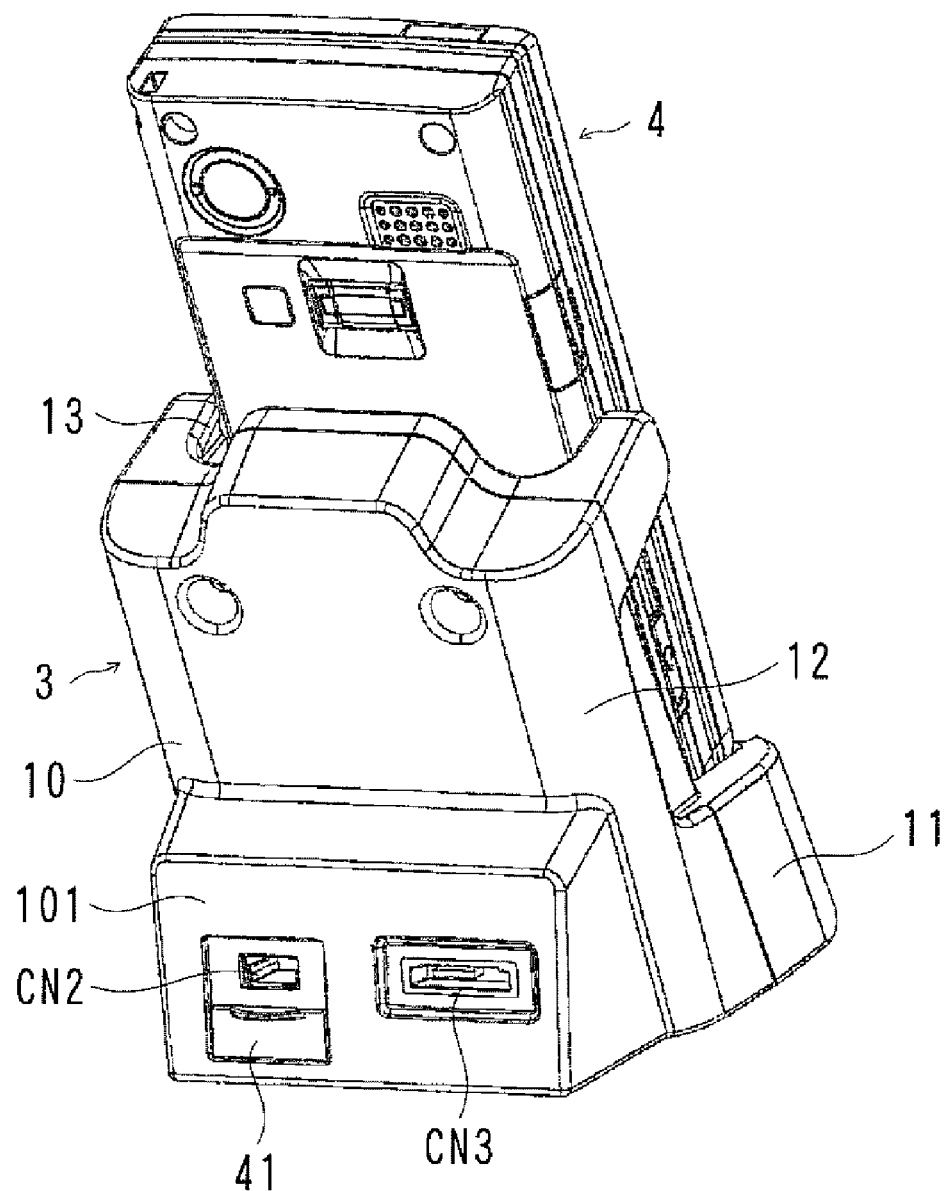
FIG. 2 is a perspective view of the information processing system as seen from the rear at an angle.
Figure 3:
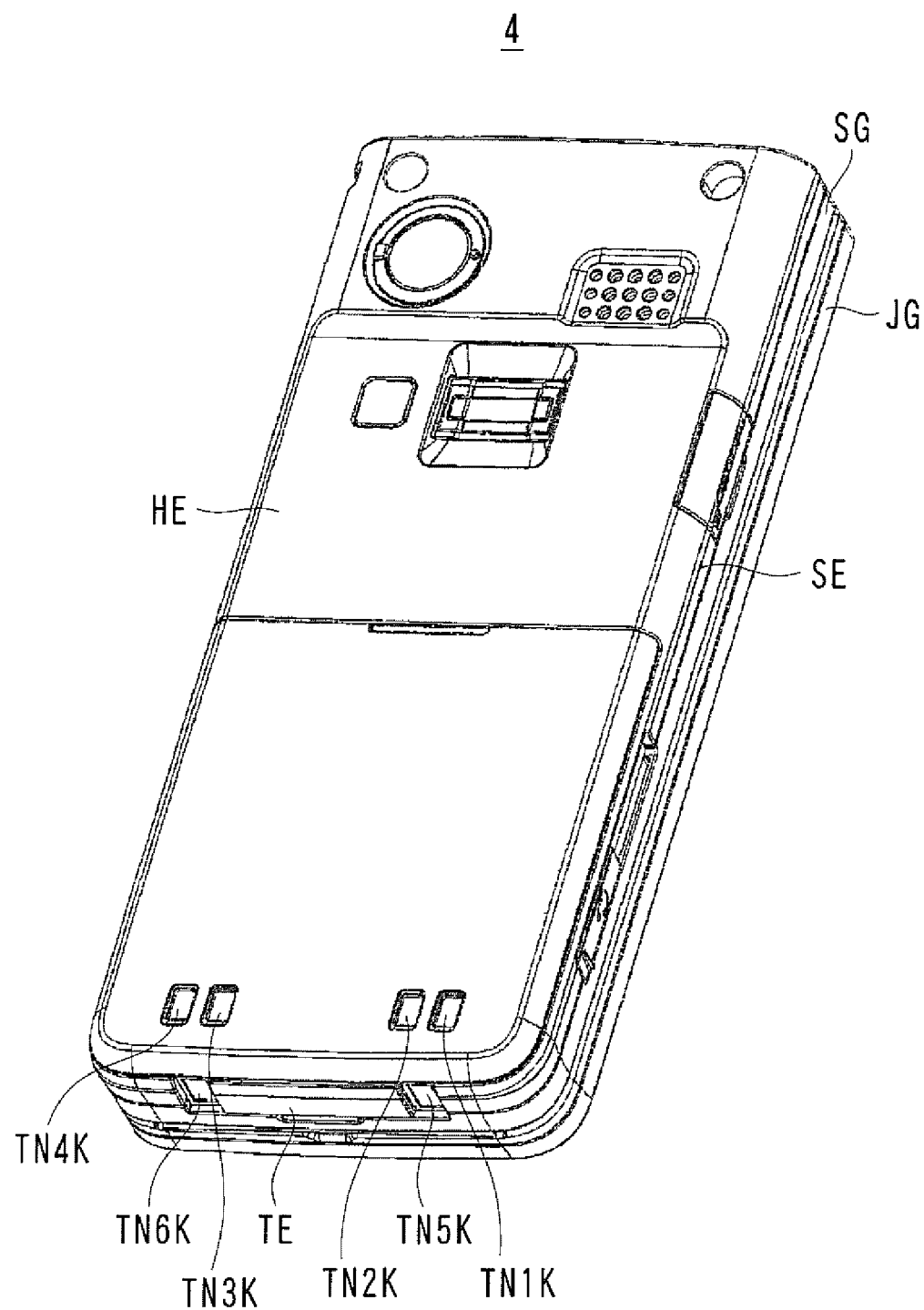
FIG. 3 is a perspective view of a mobile phone as seen from the rear at an angle.
Figure 4:
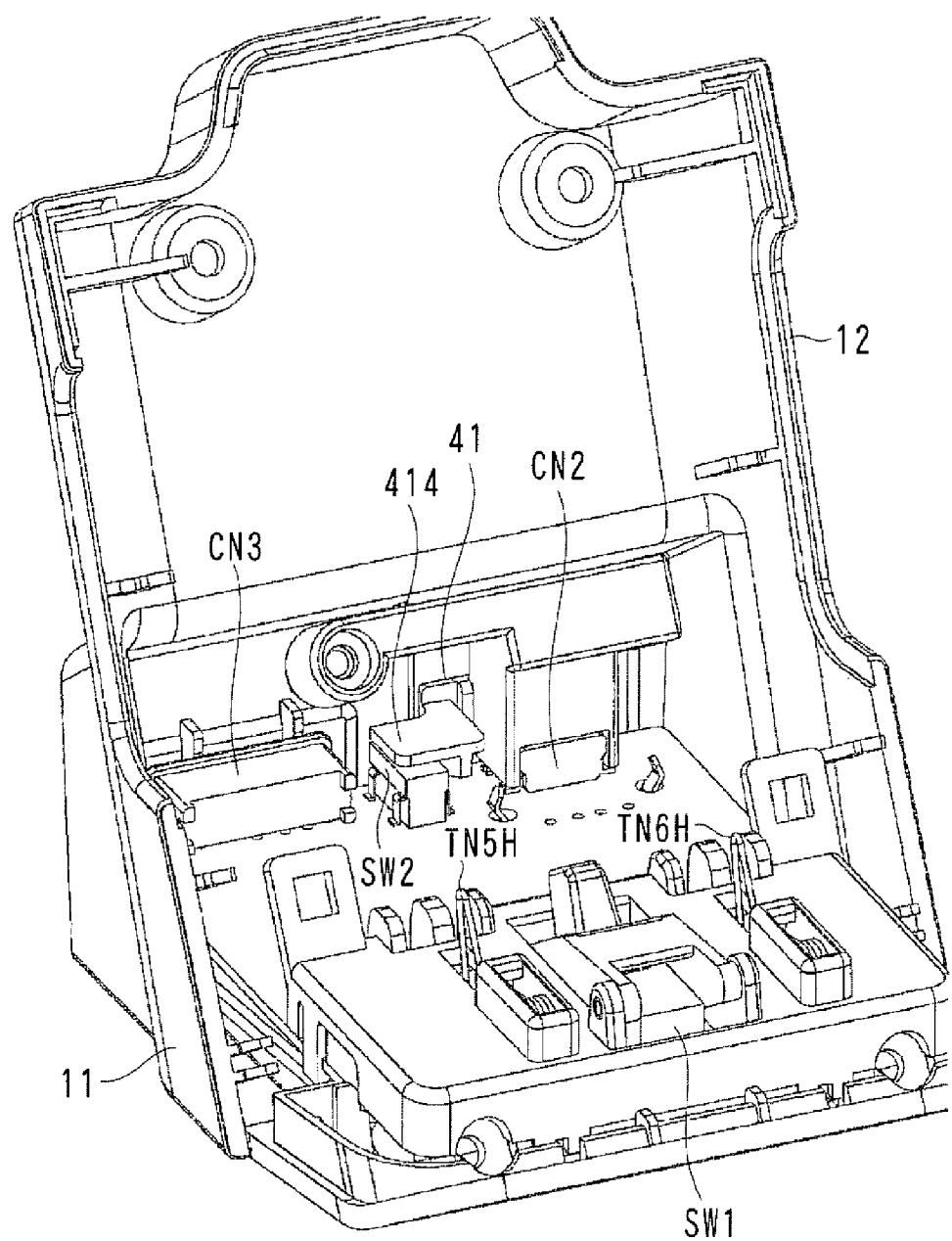
FIG. 4 is a perspective view illustrating an internal structure of a holding base.

In FIGS. 1 to 3, an information processing system 1 of the present embodiment is composed of a holding base 3 and a mobile phone 4. In the present embodiment, the mobile phone 4, which is an electronic device, is a sliding mobile phone having a substantially rectangular parallelepiped outer shape, and a transmitter side (fixed side) SG and a receiver side (movable side) JG coupled by a slide mechanism. In the mobile phone 4, charging electrodes TN5K and TN6K are provided on a bottom TE, and communication electrodes TN1K to TN4K are provided on a back HE.

The holding base 3 removably holds the mobile phone 4 with the mobile phone 4 inclined backwards. A holding base body 10 covering the substantial entirety of the holding base 3 and forming the outer shape is produced by molding a synthetic resin material.

The holding base body 10 has a bottom receiving portion 11 for supporting the bottom TE of the mobile phone 4, a back receiving portion 12 for supporting the back HE, and arms 13 for sandwiching and supporting both sides SE.

With the holding base 3, in the case where the mobile phone 4 is merely put in the holding base body 10, that is, in a free state of the mobile phone 4, the back HE is raised from the back receiving portion 12, and is supported by tip portions of the arms 13. As a result of the user pushing the mobile phone 4 backwards, the arms 13 bend to allow both sides SE to fit into the arms 13, and the back HE comes in contact with and is supported by the back receiving portion 12.

Note that a position in which the mobile phone 4 is held by the holding base 3 in a free state (position illustrated in FIG. 7) will be denoted as a "first holding position HT1", and a position in which both sides SE of the mobile phone 4 fit into and are held by the arms 13 (position illustrated in FIG. 6) will be denoted as a "second holding position HT2".

The charging electrodes TN5K and TN6K contact and are electrically connected to power supply terminals TN5H and TN6H of the holding base 3 in both the first holding position HT1 and the second holding position HT2. The communication electrodes TN1K to TN4K, in the first holding position HT1, are separated from and do not contact signal terminals TN1H to TN4H, resulting in being not electrically connected (see FIG. 7). However, in the second holding position HT2, the communication electrodes TN1K to TN4K contact and are electrically connected to the signal terminals TN1H to TN4H (see FIG. 6).

Referring also to FIGS. 4 to 13, the holding base 3 is provided with multiple types of connectors CN1 and CN2 that are connected to the signal terminals TN1H to TN4H and are for mutually exclusively connecting to another electronic device, a cover member 41 that is movably provided so as to open and close connecting ports of the multiple types of connectors CN1 and CN2, and to selectively open the connecting port of only one of the types of connectors CN1 and CN2, and a switch SW2 that detects the open position of the cover member 41.

That is, the cover member 41 is provided so as to exclusively open the connecting ports of the two connectors CN1 and CN2 by sliding. In other words, the cover member 41 acts as a shutter that blocks connecting ports other than that of the usable connector CN.

The switch SW2 switches off when the connecting port of the one connector CN1 is open, and switches on when the connecting port of the other connector CN2 is open.

The connectors CN1 and CN2 are attached to the surface of a printed circuit board 31, and are connected to the signal terminals TN2H to TN4H. The connector CN2 is attached at the same position as that of the connector CN1 on the opposite surface to the surface to which the connector CN1 is attached.

In the present embodiment, the connector CN1 is a USB-A terminal, and the connector CN2 is a USB-B terminal. The USB-A terminal is provided on the host side, and USB-B terminal is provided on the slave side (peripheral device side or device side). Also, mini USB terminals may be used. Note that the connector CN1 may be denoted as a "first connector CN1" or as "the one connector CN1", and that the connector CN2 may be denoted as a "second connector CN2" or as "the other connector CN2".

The printed circuit board 31 is held by the bottom receiving portion 11 of the holding base body 10 with the connector CN1 held underneath the printed circuit board 31, such that the connecting port of the connector CN1 faces a back side EG of the holding base body 10, and with the end edge of a front side ZG positioned lower than the end edge of the back side EG by an offset amount FS1. To be specific, the bottom receiving portion 11 has therein, for example, catch portions for holding the printed circuit board 31. The printed circuit board 31 is gripped by the catch portions, or abuts against the catch portions, so that the printed circuit board 31 is positioned and held.

Figure 6:
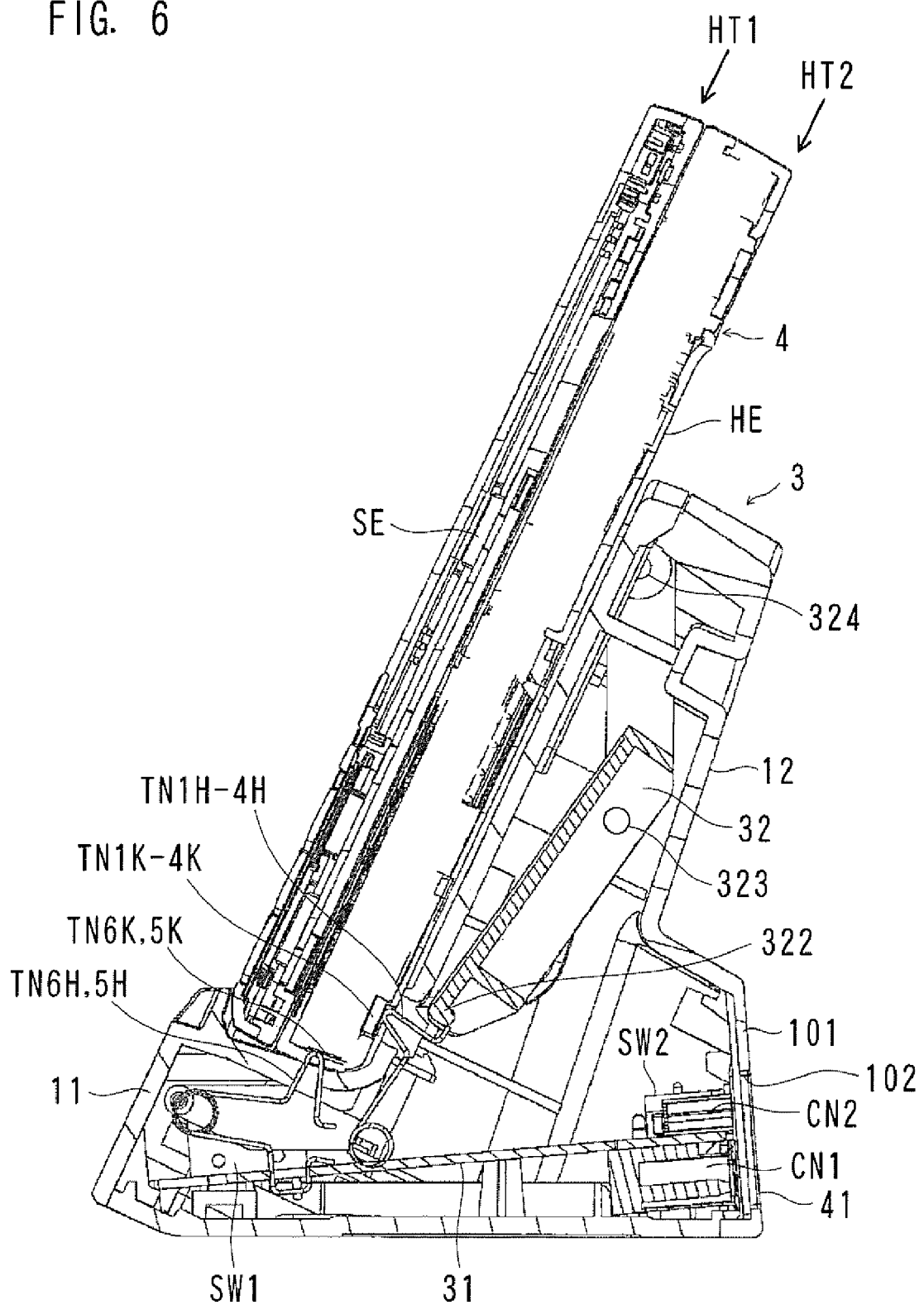
FIG. 6 is a right side cross-sectional view of the information processing system.
Figure 7:
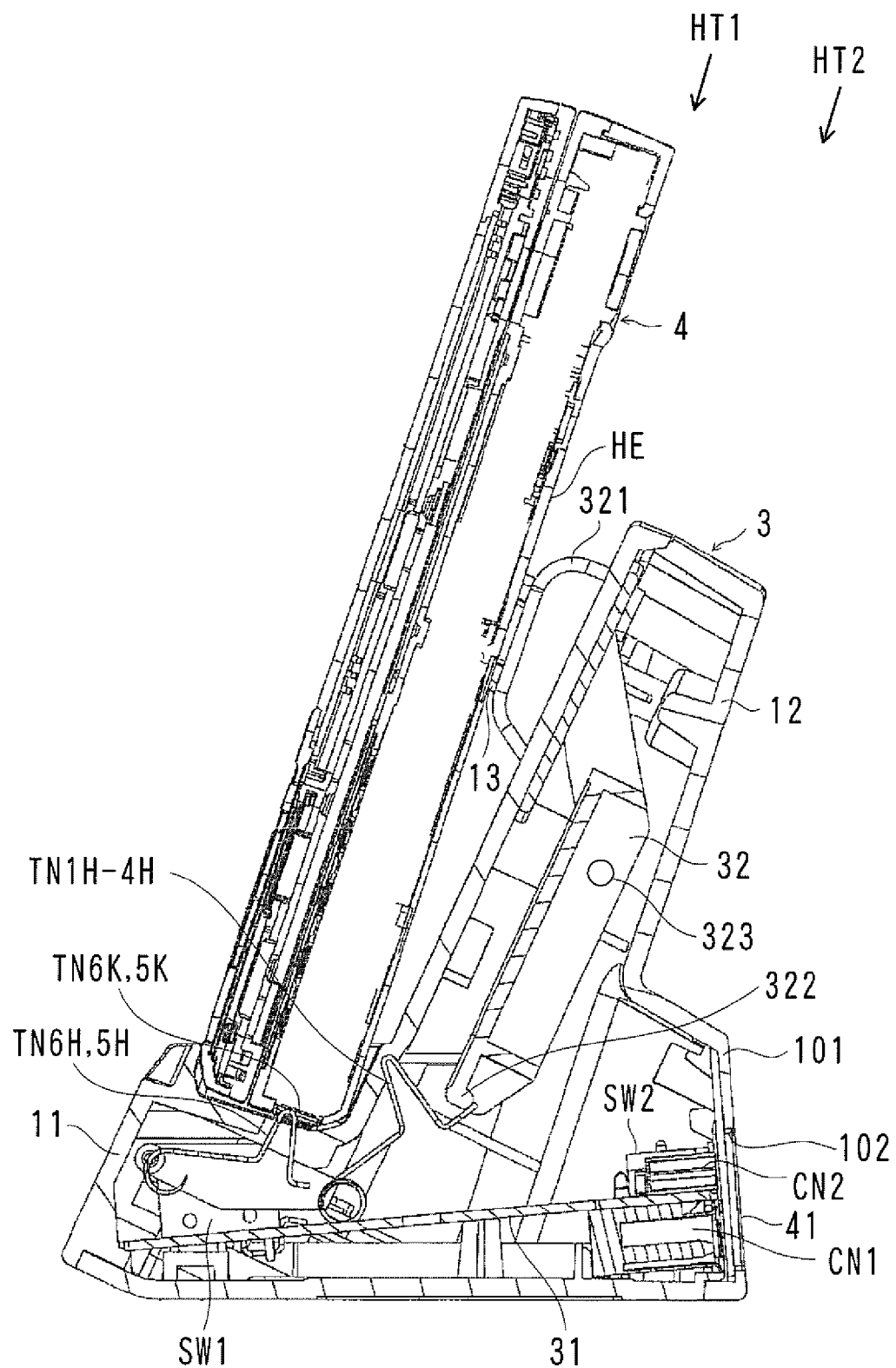
FIG. 7 is a right side cross-sectional view of the information processing system.
Figure 8:
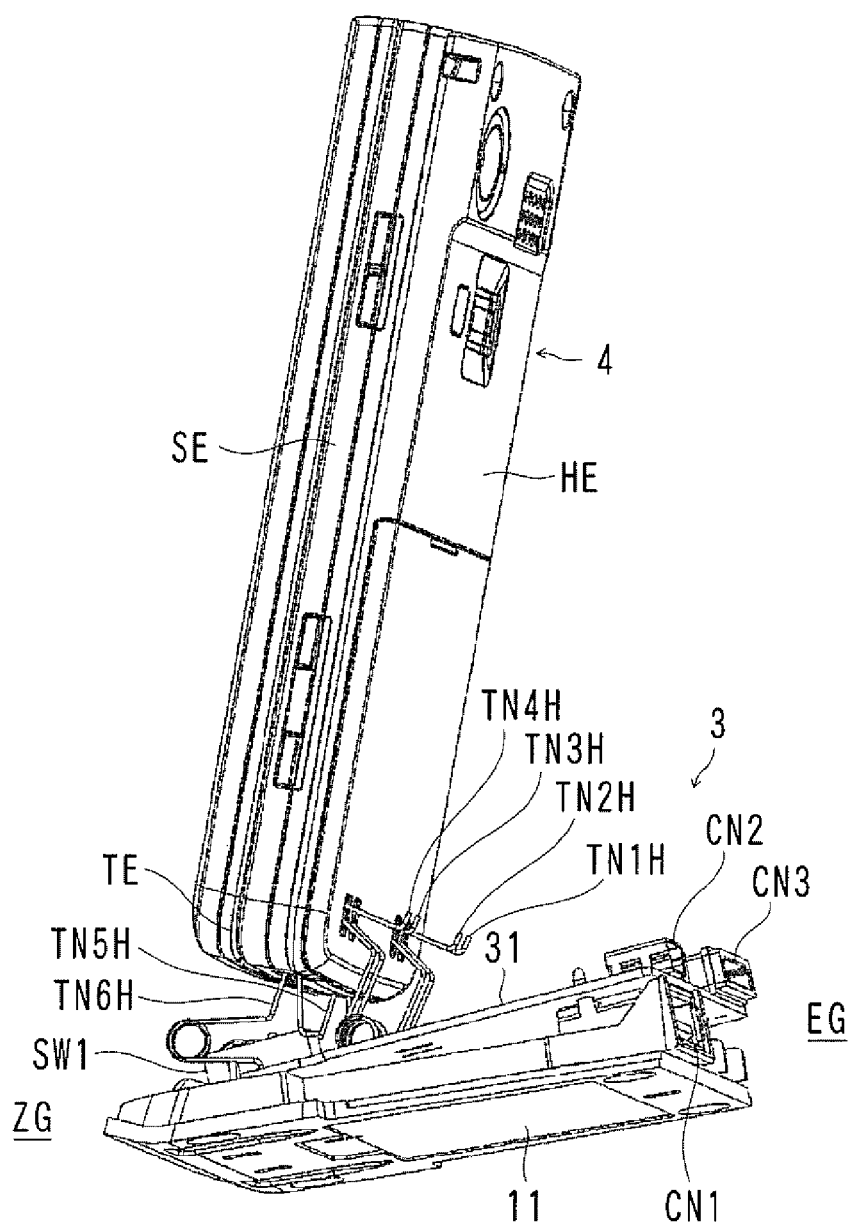
FIG. 8 is a perspective view illustrating a state of signal terminals in the information processing system.
Figure 9:
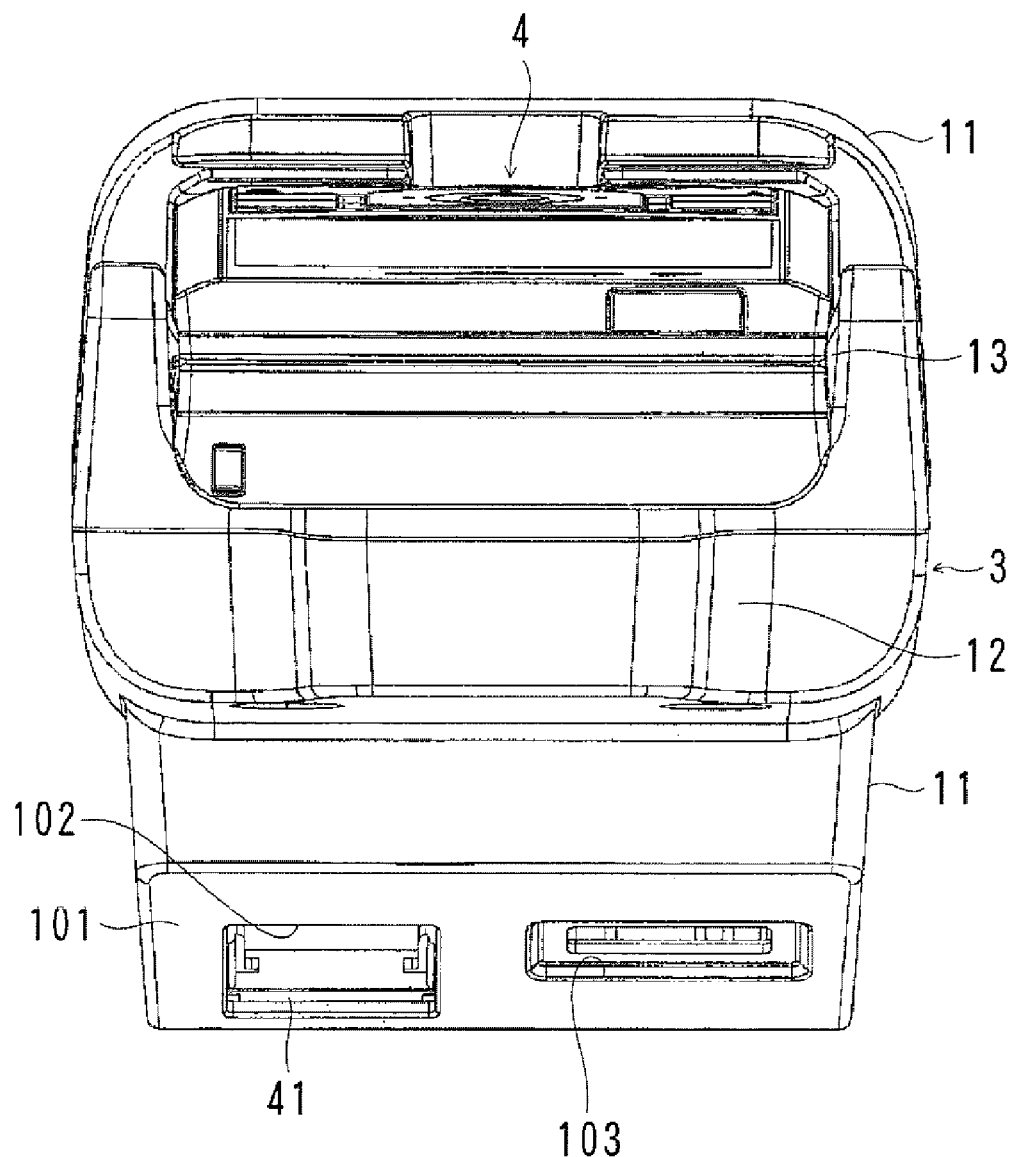
FIG. 9 is a plan view of the information processing system.
Figure 10:
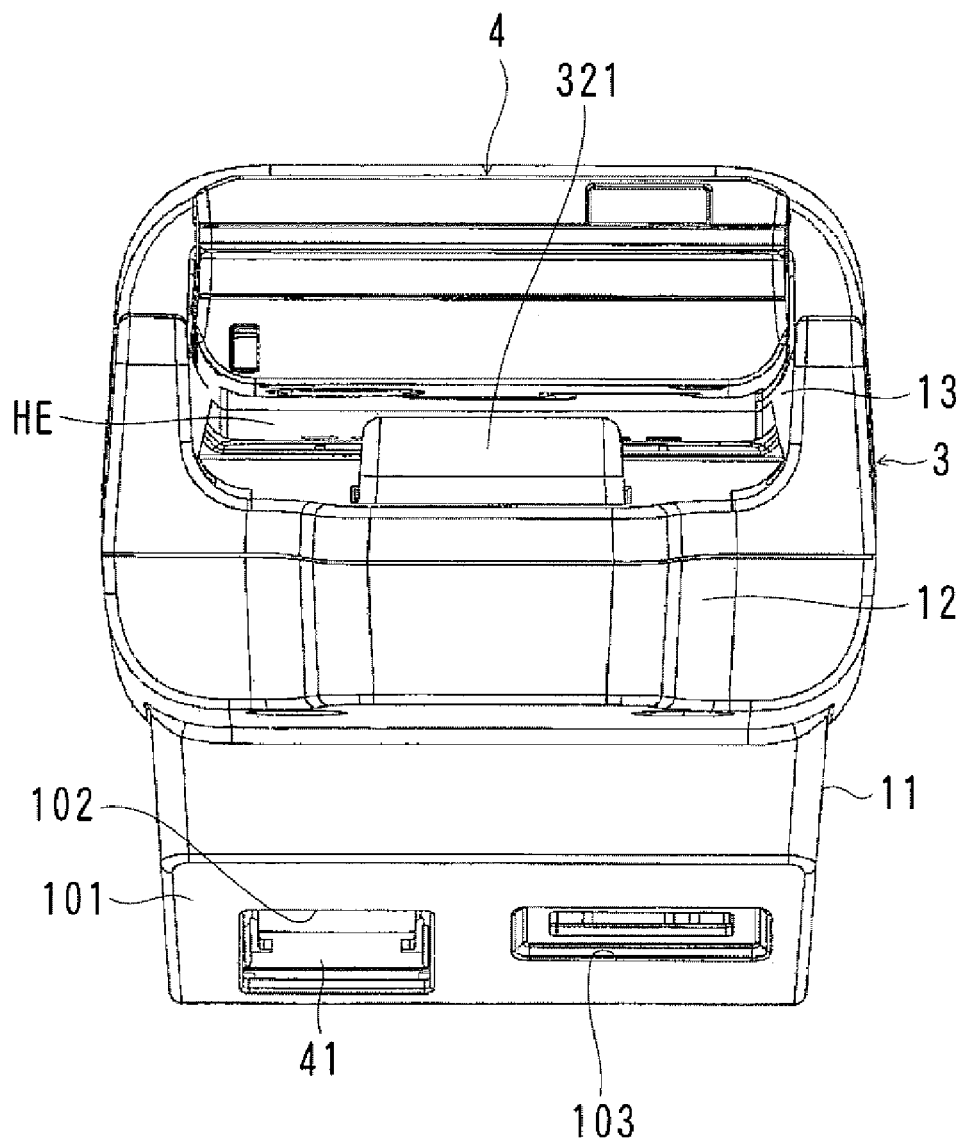
FIG. 10 is a plan view of the information processing system.
Figure 14:
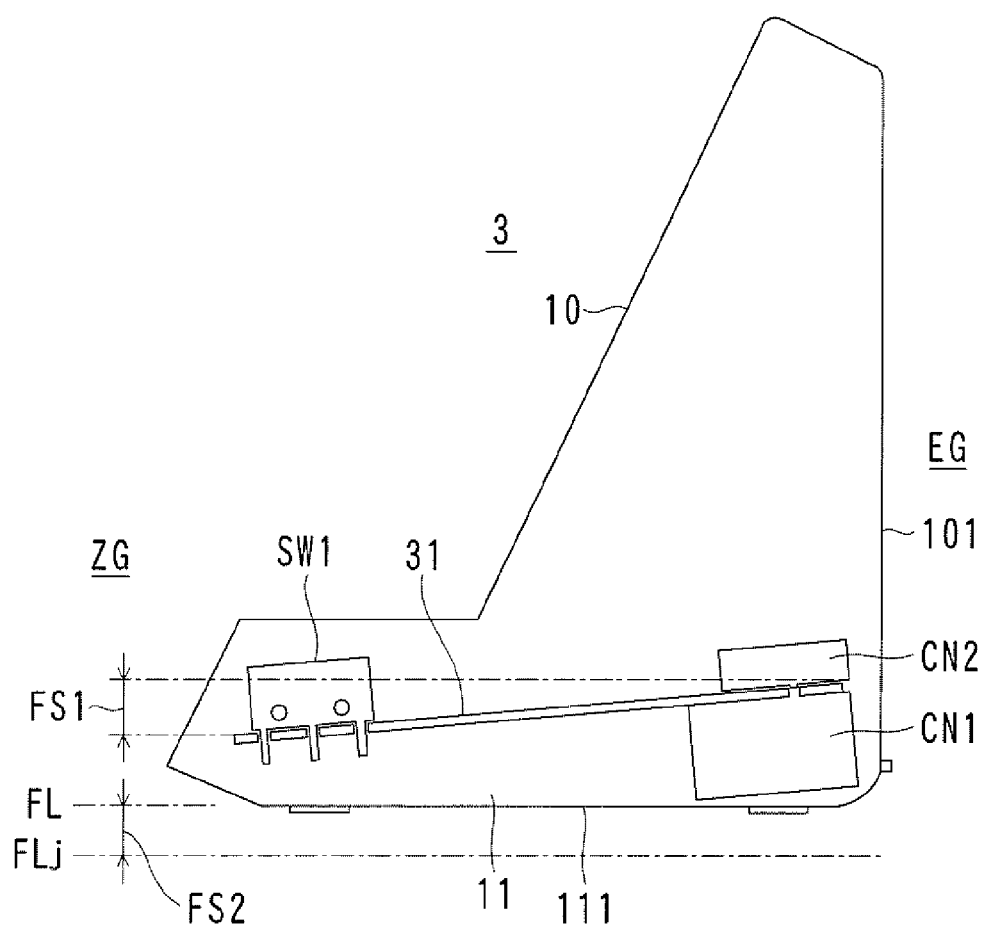
FIG. 14 is a diagram depicting a state in which a printed circuit board is attached to the holding base.

That is, as illustrated in FIGS. 6, 7, and 14, the printed circuit board 31 is attached at an angle, such that the rear end edge is higher than the front end edge by the offset amount FS1. Note that the offset amount FS1 is set to be less than the thickness (longitudinal dimension) of the connector CN1.

Referring to FIG. 14, the printed circuit board 31 is inclined to a bottom surface (bottom) 111 by the offset amount FS1 toward the front side ZG. This reduces a waste space provided under the printed circuit board 31 on the front side ZG, leading to the effective utilization of the space.

Figure 15:
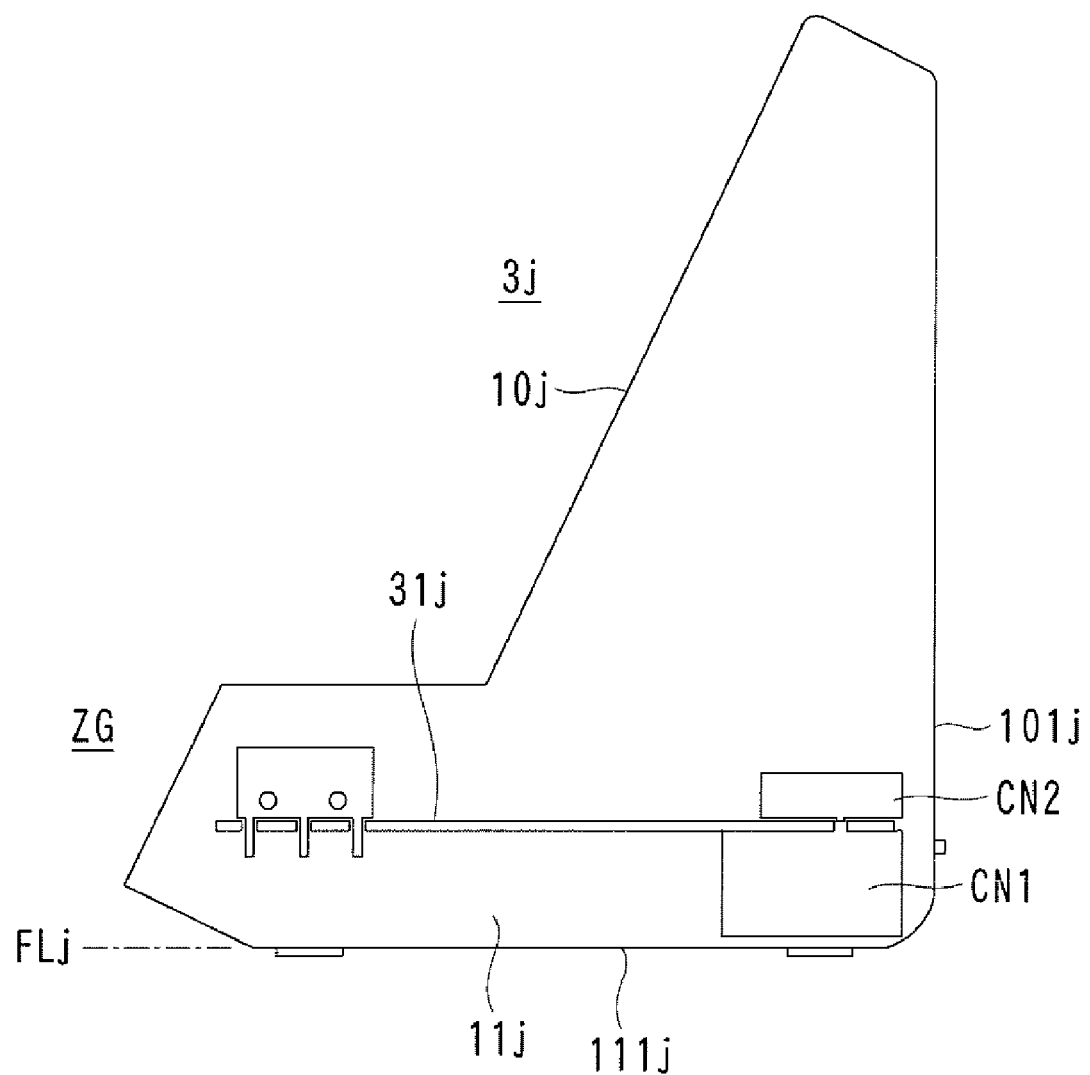
FIG. 15 is a comparison diagram depicting a method for attaching a printed circuit board to a holding base.

Incidentally, in the case where a printed circuit board 31j is disposed in parallel to a bottom surface 111j as illustrated in FIG. 15, a large and waste space is provided under the printed circuit board 31j on the front side ZG. This reduces the efficiency of utilizing the space, which increases the size of a holding base body 10j.

In this embodiment as illustrated in FIG. 14, the height of the bottom receiving portion 11 is reduced by an amount corresponding to the offset amount FS1. Compared to the height of a bottom receiving portion 11j of FIG. 15, the height of the bottom receiving portion 11 of FIG. 14 is reduced by an amount FS2 that is almost the same as the offset amount FS1.

Thus, with the holding base 3 according to this embodiment, the height of the bottom receiving portion 11 is low. Thereby, the position of the center of gravity of the holding base 3 is lowered, so that the holding base 3 is stabilized. In particular, the holding base 3 is configured to charge the battery of the mobile phone 4 tossed into the bottom receiving portion 11. Thus, it is important that the position of the center of gravity of the holding base 3 be made low in order to keep the holding base 3 steady when the mobile phone 4 is tossed into the bottom receiving portion 11.

As discussed above, the two connectors CN1 and CN2 are thereby disposed with respective connecting ports facing the same direction in substantially the same plane. The connecting port of the connector CN2 opens above the connecting port of the connector CN1. The dimensions of the connecting port of the one connector CN1 in the slide direction (up and down direction) of the cover member 41 are greater than that of the other connector CN2.

A connector CN3 and switches SW1 and SW2 are attached to the surface of the printed circuit board 31 on the same side that the connector CN2 is attached. Also, the signal terminals TN1H to TN4H and the power supply terminals TN5H and TN6H mentioned above are attached to the same surface of the printed circuit board 31. The connector CN3 is connected to the power supply terminals TN5H and TN6H via the switch SW1. Note that these components are attached by soldering.

The signal terminals TN1H to TN4H and the power supply terminals TN5H and TN6H are all formed by gilding the surface of a metal wire rod having elasticity, and bending the gilded wire rod into prescribed shapes.

The holding base body 10 has, on the back thereof, a wall 101 perpendicular to the printed circuit board 31, and the connecting ports of the connectors CN1 and CN2 open at an opening 102 provided in the wall 101. Also, the connector CN3 opens at an opening 103 provided in the wall 101.

Figure 11A:
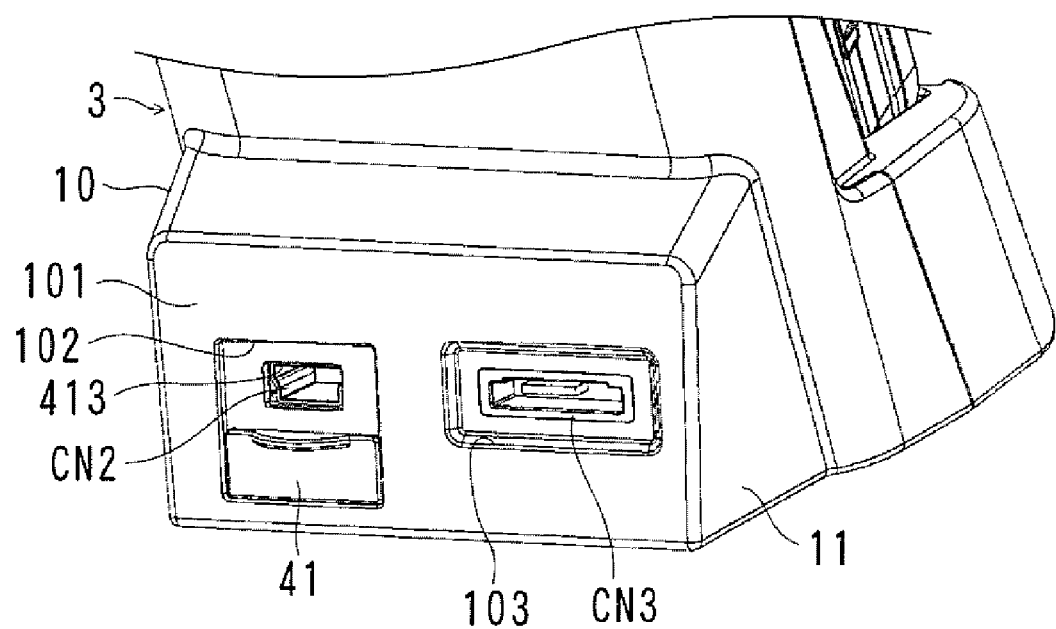
FIGS. 11A and 11B are enlarged perspective views illustrating the vicinity of USB connectors in the holding base.
Figure 11B:
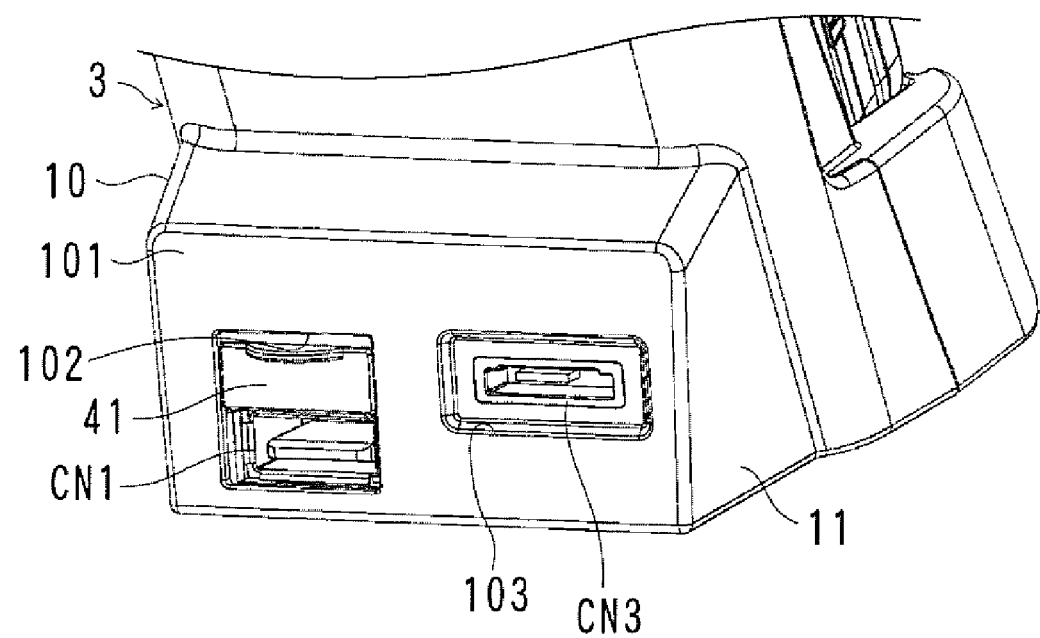
Figure 12:
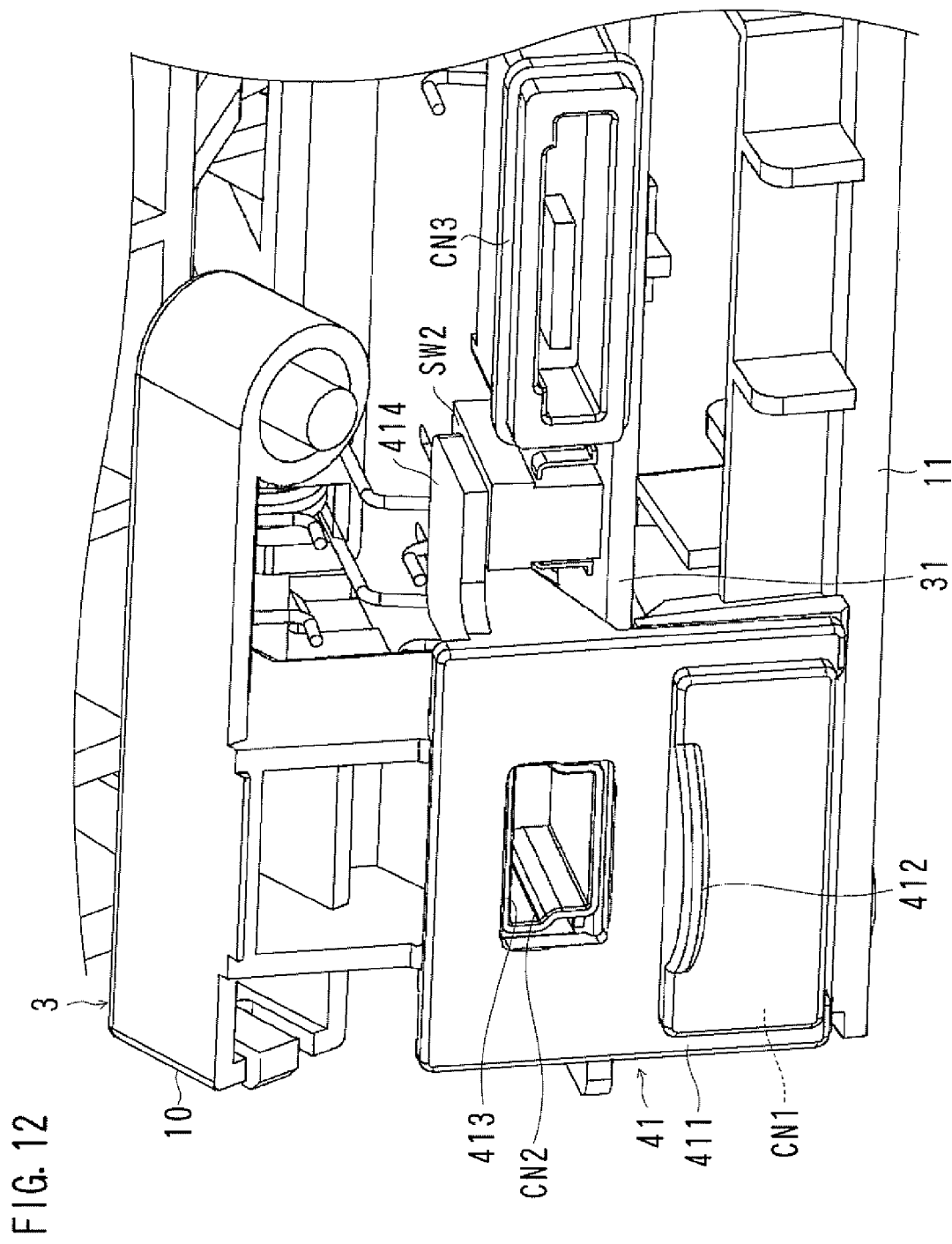
FIG. 12 is a perspective view illustrating an internal structure as seen from the back side of the holding base.

As illustrated in FIGS. 11A and 11B, the cover member 41 is slidably provided with respect to the opening 102 provided in the wall 101 at the back of the holding base body 10.

The cover member 41 is integrally formed from a synthetic resin material, and has a rectangular planar body 411, a handle portion 412 provided so as to protrude from the surface of the body 411, an opening 413 provided in an upper middle portion, and a dog 414 provided on the rear side for switching the switch SW2 on and off.

The cover member 41 slots into a slide groove (not illustrated) provided on the inner side of the wall 101, and is slidable up and down. When the cover member 41 is positioned at the bottom of the opening 102, as illustrated in FIG. 11A, the opening 413 is disposed in front of the connecting port of the connector CN2, as a result of which external connection is only possible to the connector CN2. At this time, the dog 414 causes the switch SW2 to operate by pushing from above, and the switch SW2 is thereby switched on (see FIGS. 4, 12).

Figure 5:
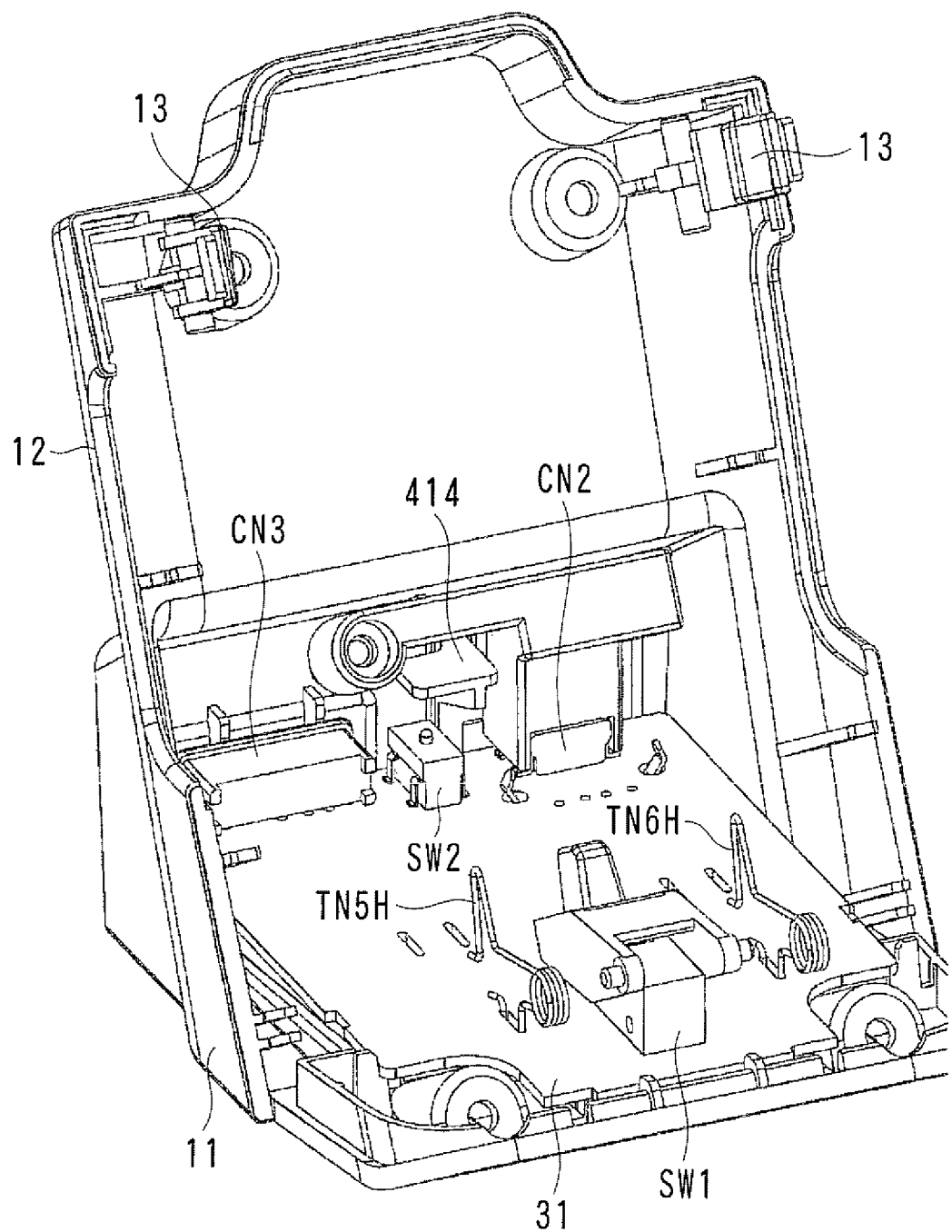
FIG. 5 is a perspective view illustrating an internal structure of the holding base.
Figure 13:
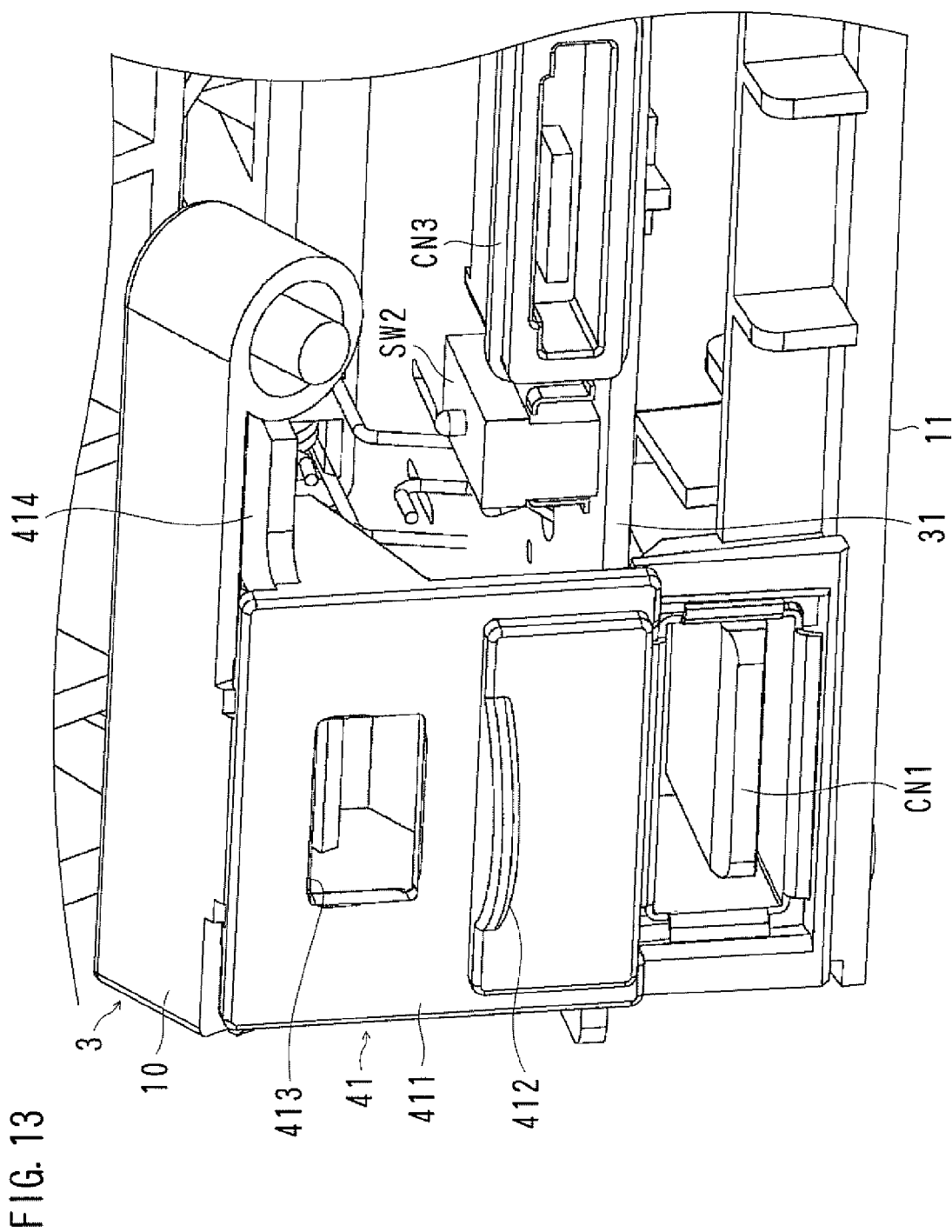
FIG. 13 is a perspective view illustrating an internal structure as seen from the back side of the holding base.

Also, when the cover member 41 is positioned at the top of the opening 102 such as illustrated in FIG. 11B, the lower half of the opening 102 is open, as a result of which the connecting port of the connector CN1 is opened, enabling external connection to only the connector CN1. At this time, the dog 414 is separated from the switch SW2, and the switch SW2 is switched off (FIGS. 5, 13).

Incidentally, when the mobile phone 4 is put in the bottom receiving portion 11, the switch SW1 is configured to be switched on via a dog (not illustrated). That is, a hole (not illustrated) is provided in the middle of the bottom receiving portion 11, and a dog (not illustrated) that projects outwardly from the hole is provided, and when the mobile phone 4 is put in the bottom receiving portion 11, the bottom TE of the mobile phone 4 pushes the dog, resulting in the switch SW1 being switched on. The charging power supplied from an external source via the connector CN3 appears at the power supply terminals TN5H and TN6H, as a result of the switch SW1 being switched on. Note that in the case where the mobile phone 4 is tossed into the bottom receiving portion 11, the switch SW1 will be switched on, whether the mobile phone 4 is in the first holding position HT1 or the second holding position HT2.

As illustrated in FIGS. 6 and 7, the back receiving portion 12 is provided on the inside thereof with a lever 32 composed of synthetic resin, and a tip 321 of the lever 32 projects outwardly from within the back receiving portion 12. The lever 32, the main body of which is rotatable on a shaft 323, is biased by a spring (not illustrated) so as to be in the projected position illustrated in FIG. 7 in a free state. In the first holding position HT1 mentioned above, the lever 32 is in a free state.

The tip 321 is rotatably supported on a shaft 324 relative to the body of the lever 32. Since the tip 321 may thereby be displaced in contact with the back HE of the mobile phone 4, it is possible to prevent the back HE of the mobile phone 4 from rubbing against the surface of the tip 321 and being marked, when the mobile phone 4 shifts from the first holding position HT1 to the second holding position HT2.

In the projected position of the lever 32, an operation end 322 thereof engages the ends of the signal terminals TN1H to TN4H and moves them to the right side in FIG. 7, as a result of which the signal terminals TN1H to TN4H are pulled inside the back receiving portion 12. In this state, the signal terminals TN1H to TN4H and the electrodes TN1K to TN4K will be separated, and will not come in contact with one another, whether the mobile phone 4 is tossed into or set in the bottom receiving portion 11.

Then, as a result of the user pushing the mobile phone 4 into the back receiving portion 12 so as to assume the second holding position HT2, the lever 32 is pushed to within the back receiving portion 12 by the back HE of the mobile phone 4, the operation end 322 moves to the left in FIG. 6 at the same time, and the signal terminals TN1H to TN4H are released from the pull of the operation end 322. As a result, the signal terminals TN1H to TN4H project out from a hole provided in the back receiving portion 12 as a result of their elastic force, and contact and are connected to the electrodes TN1K to TN4K on the back HE of the mobile phone 4.

Thus, the printed circuit board to which the first connector is attached is held, at an angle, by the bottom of the holding base body with the first connector held underneath the printed circuit board, such that a connecting port of the first connector faces the back side of the holding base body. Thereby, a space in the bottom is effectively utilized, which reduces the size of the holding base body.

Next, the circuitry of the holding base 3 will be described.

Figure 16:
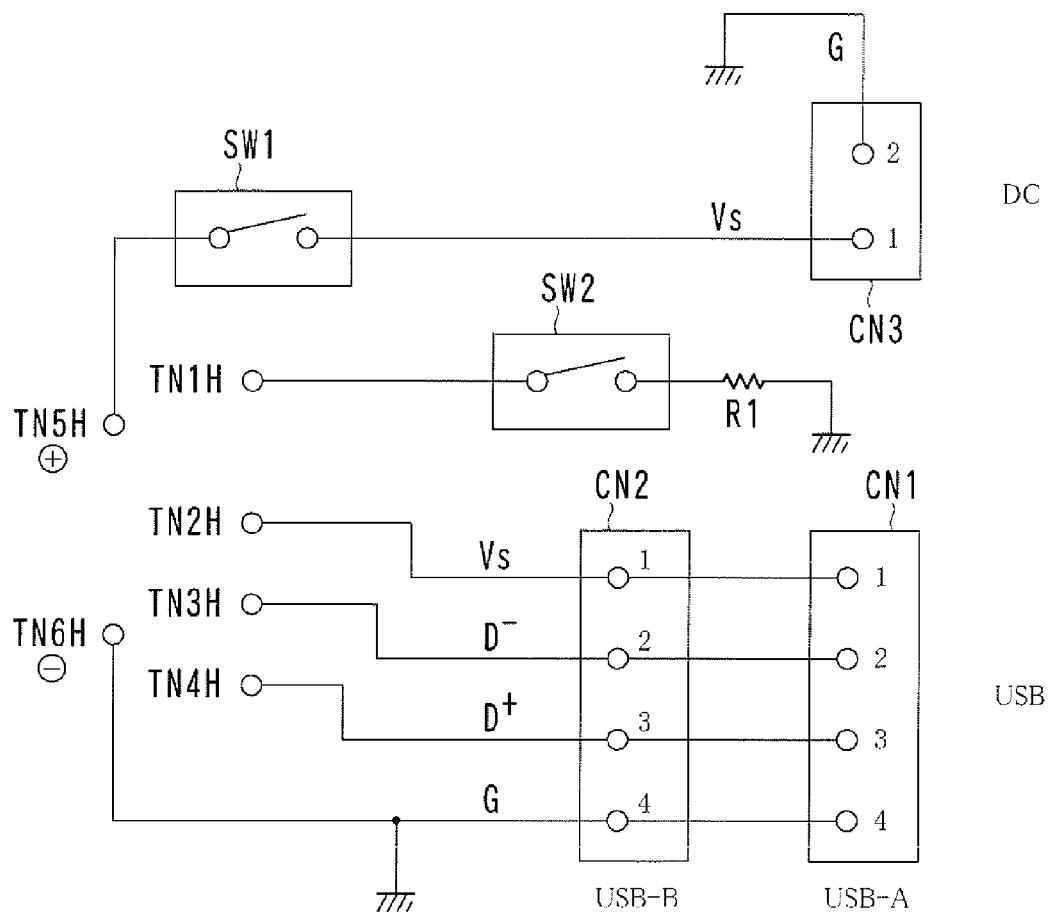
FIG. 16 is a circuit diagram illustrating the internal circuitry of the holding base.

As illustrated in FIG. 16, in the USB connectors CN1 and CN2, respective pins P1 to P4 are connected in parallel to one another, and are respectively connected to the signal terminals TN2H, TN3H and TN4H, and the power supply terminal TN6H. The power supply terminal TN6H, being the minus side of the power supply, is connected to a ground line G.

In the charging connector CN3, a pin P1 on the plus side is connected to the power supply terminal TN5H via the switch SW1, and a pin 2 on the minus side is connected to the ground line G.

The switch SW2 for detecting switching the connectors CN1 and CN2 is connected to the signal terminal TN1H, and connects the signal terminal TN1H to the ground line G according to the on and off state thereof. Consequently, an "L" or an "H" signal S1 may be output to the mobile phone 4.

That is, in a state where the cover member 41 is lowered to the bottom position, it is only possible to use the connector CN2 as mentioned above, at which time the switch SW2 will be on and the signal terminal TN1H will be "H". Also, in a state where the cover member 41 is raised to the top position, it is only possible to use the connector CN1, at which time the switch SW2 will be off and the signal terminal TN1H will be "L". Consequently, which of the connectors CN1 and CN2 is being used is discerned, by using the signal that appears in the signal terminal TN1H.

Next, the information processing system 1 composed of the holding base 3 and the mobile phone 4 will be described.

Figure 17:
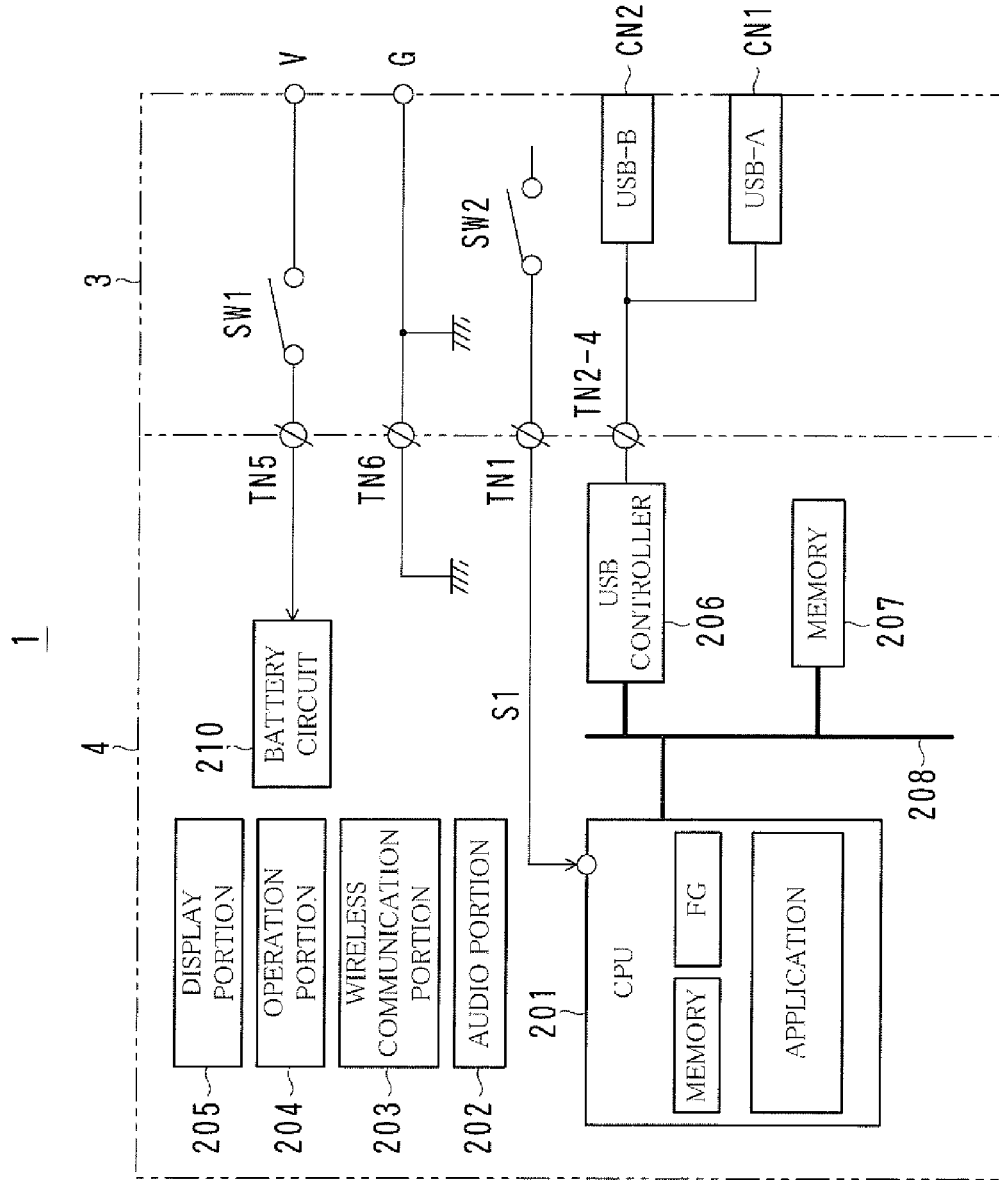
FIG. 17 is a block diagram functionally illustrating the circuitry of the information processing system.

As illustrated in FIG. 17, the mobile phone 4 is provided with a CPU 201, an audio portion 202, a wireless communication portion 203, an operation portion 204, a display portion 205, a USB controller 206, a memory 207, a bus 208 and a battery circuit 210, as well as a camera, a fingerprint sensor, a chip for the noncontact communication standard FeliCa®, and other chips or electronic circuitry that are not illustrated.

The CPU 201 controls the operation of each portion and the overall operation. The CPU 201, by executing an OS and various application programs stored in the memory 207, is able to perform various processing, and also realize various functions. For example, the CPU 201 is able to realize various functions including email transmission and reception, Internet communication, Web browsing, still image shooting, moving image shooting, credit card settlement, a music data library function, a USB host function, a USB slave function, a data input device function, and a data display device function, in addition to the wireless phone function required as a mobile phone. Also, a function as a personal computer is realizable by installing Windows® as the OS.

Also, the signal S1 from the switch SW2 is configured to be input to the CPU 201 via the electrode TN1. The CPU 201 discriminates whether the mobile phone 4 is operating as a USB host or slave, according to the state of the signal S1. That is, a flag is turned on in the CPU 201 according to the signal S1, for example, and according to the state of the flag, it is determined whether the mobile phone 4 is operating as a USB host or whether it is operating as a slave.

The wireless communication portion 203 is communicable with a fixed station (base station) in a wireless network, and has a handover function that enables communication while switching between multiple fixed stations. Long-distance wireless communication and short-distance wireless communication according to multiple communication standards may be performed by the wireless communication portion 203. For example, the wireless communication portion 203 is adapted to communication standards such as FORMA-B, WCDMA, WiMAX, and wireless LAN.

The USB controller 206 has a USB-OTG function, and is operable as both a USB host and slave. As mentioned above, the CPU 201 controls the USB controller 206, according to the signal S1.

The memory 207 includes a SIM card and a micro SD memory, as well as a semiconductor memory, a magnetic disk or the like. The SIM card stores communication-related information and personal information on the user such as telephone numbers, SIP addresses and IP addresses, for example. The micro SD memory stores captured image data, transmitted and received emails, data downloaded from a network, and telephone book data, for example.

The bus 208 is any of a variety of external buses or memory buses, a PCI bus, or the like. Data transfer between the CPU 201 and peripheral elements is performed via the bus 208.

The battery circuit 210 is composed of a built-in battery, a battery charging circuit, a safety circuit, and the like. Power supplied from the charging electrodes TN5K and TN6K charges the battery, and also forms the power supply for operating the mobile phone 4.

In a state where the mobile phone 4 is held at the second holding position HT2 by the holding base 3, the electrodes TN1K to TN4K and the signal terminals TN1H to TN4H, and the electrodes TN5K and TN6K and the power supply terminals TN5H and TN6H are in a conduction state, respectively connected to one another. Also, the switch SW1 is on, and the connector CN3 and the power supply terminals TN5H and TN6H are in a connected state.

Therefore, power can be supplied to the mobile phone 4 and charging performed, by connecting a charging power unit to the connector CN3 via a charging cord. Also, the information processing system 1 operates as a USB host or slave, by connecting another electronic device to the connector CN1 or the connector CN2 via a USB cord.

For example, when an external electronic device is connected to the connector CN1 via a USB cord, the mobile phone 4 operates as a host (superior device), and the external electronic device operates as a slave (subordinate device). The external electronic device operates as an input apparatus, an output apparatus or a storage apparatus with respect to the mobile phone 4, for example.

Also, when an external electronic device is connected to the connector CN2 via a USB cord, the mobile phone 4 operates as a slave, and the external electronic device operates as a master. The mobile phone 4 operates as a storage apparatus or a communication apparatus, for example.

Thus, according to the present embodiment, the mobile phone 4 may be easily switched, for example, between being a host or a slave, by providing multiple types of the connectors CN1 and CN2 with different shapes. Moreover, because the switched state is detected by the switch SW2 which is interlocked to the opening and closing of the connecting ports of the connectors CN1 and CN2, switching may be readily performed automatically without error.

Because the respective connecting ports of the two connectors CN1 and CN2 are disposed facing the same direction in substantially the same plane, attaching and opening and closing the cover member 41 is easy, as is connecting a USB cable to the connecting ports.

Because the dimensions of the one connector CN1 are greater than the dimensions of the other connector CN2, the external dimensions of the cover member 41 are determined in accordance with the connecting port of the larger connector CN1, and thus the connecting port of the smaller connector CN2 may be accommodated by providing the opening 413 in the cover member 41.

In the embodiment mentioned above, a micro switch is used for the switch SW1, which is a detection sensor, but other forms of switches or various types of sensors such as a proximity sensor or a photoelectric sensor may be used.

In the embodiment mentioned above, the cover member 41 is provided so as to be slidable, but may be provided so as to be rotatable. One each of the connectors CN1 and CN2 is provided, but two or more of each may be provided. In this case, multiple connecting ports are usable at the same time for the same type of connector CN, but because the connectors are all uniformized to be either for host use or slave use, switching may be controlled according to the signal S1 of the switch SW2.

Also, in the case where three or more types of connectors CN are provided instead of two, preferably only one of the types of connectors CN is connectable, with control being performed after identifying the connectable connector CN using the signal S1.

In the embodiment mentioned above, the USB connectors CN1 and CN2 and the charging connector CN3 are provided separately, but it is also possible to provide one connector for both USB use and charging. The above embodiment was described giving the mobile phone 4 as an example of an electronic device, but the present invention is applicable to a portable information device, a mobile terminal, a communication apparatus, an electronic apparatus or the like apart from the mobile phone 4.

The configuration, structure, form, dimensions, material, number, control content, control timing and the like of the signal terminals TN1H to TN4H, the power supply terminals TN5H and TN6H, the connectors CN1 and CN2, the printed circuit board 31, the bottom receiving portion 11, the back receiving portion 12, the arms 13, the mobile phone 4, the holding base 3, or the entirety or individual portions of the information processing system 1, and the method for attaching the printed circuit board 31 may be suitably modified without departing from the gist of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A holding base for removably holding an electronic device, comprising:
    a holding base body;
    a signal terminal that is provided in the holding base body, and connected to the electronic device in a holding position in which the electronic device is held; and
    a first connector that is attached to a surface of a printed circuit board, connected to the signal terminal, and connected to another electronic device,
    wherein the printed circuit board is held by a bottom of the holding base body with the first connector held underneath the printed circuit board, such that a connecting port of the first connector faces a back side of the holding base body, and with an end edge of a front side of the holding base body positioned lower than an end edge of the back side of the holding base body by an offset amount, and
    the offset amount is set to be less than a thickness of the first connector.

2. The holding base according to claim 1, wherein
    the holding base body has, on a back thereof, a wall perpendicular to the printed circuit board, and
    the connecting port of the first connector opens at an opening provided in the wall.

3. The holding base according to claim 2, wherein
    the printed circuit board has a second connector attached at a position identical with a position of the first connector on an opposite surface to the surface of the printed circuit board to which the first connector is attached; and
    a connecting port of the second connector opens, above the connecting port of the first connector, at an opening provided in the wall.

4. The holding base according to claim 3, wherein the signal terminal is attached to the printed circuit board.

5. The holding base according to claim 3, wherein the first connector is a USB-A terminal, and the second connector is a USB-B terminal.

6. An information processing system comprising:
    the holding base according to claim 1; and
    an electronic device held in the holding base,
    wherein the electronic device is a mobile phone.

7. The information processing system according to claim 6, wherein when another electronic device is connected to a connecting port of a second connector provided in the holding base, said another electronic device operates as a superior apparatus, and the mobile phone operates as a subordinate apparatus and as one of a storage apparatus and a communication apparatus.

8. The information processing system according to claim 6, wherein when another electronic device is connected to the connecting port of the first connector, the mobile phone operates as a superior apparatus, and said another electronic device operates as a subordinate apparatus and as one of an input apparatus, an output apparatus and a storage apparatus.

* * * * *